Dec. 19, 1961 J. C. NYGARD 3,014,170
HIGH-VOLTAGE GENERATOR
Filed Nov. 1, 1957 2 Sheets-Sheet 1
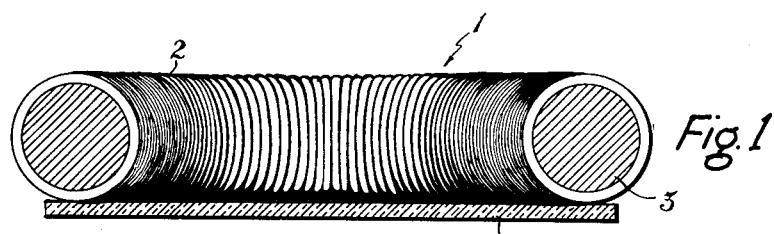
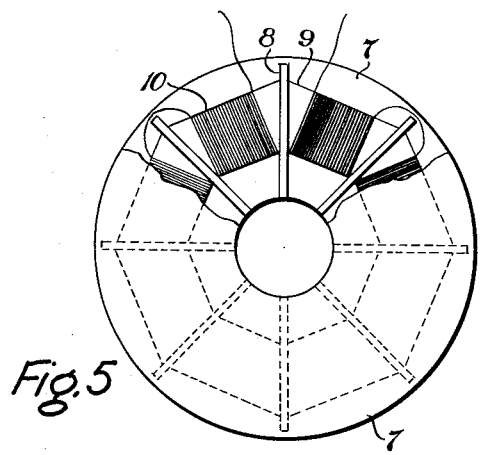
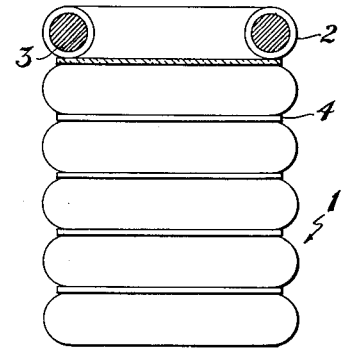
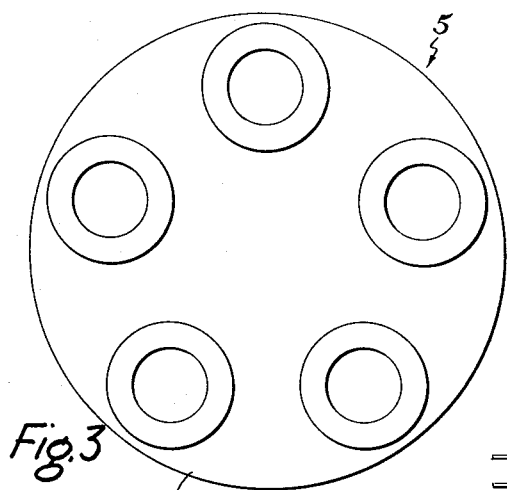
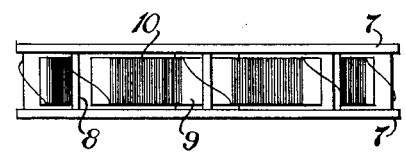
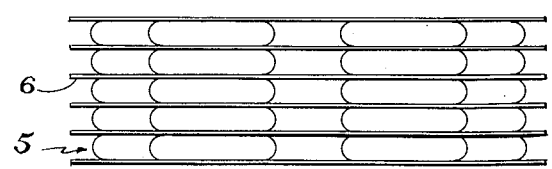

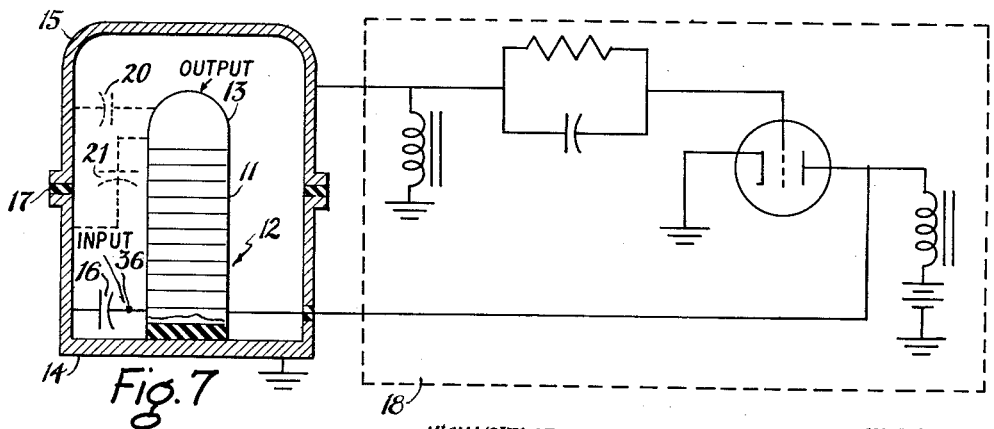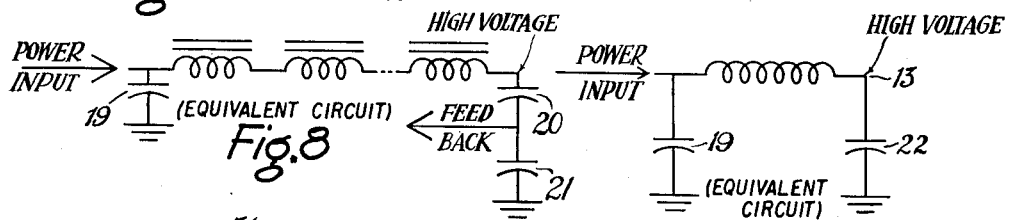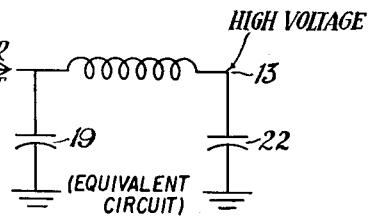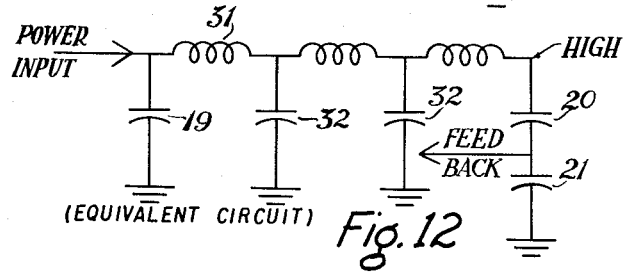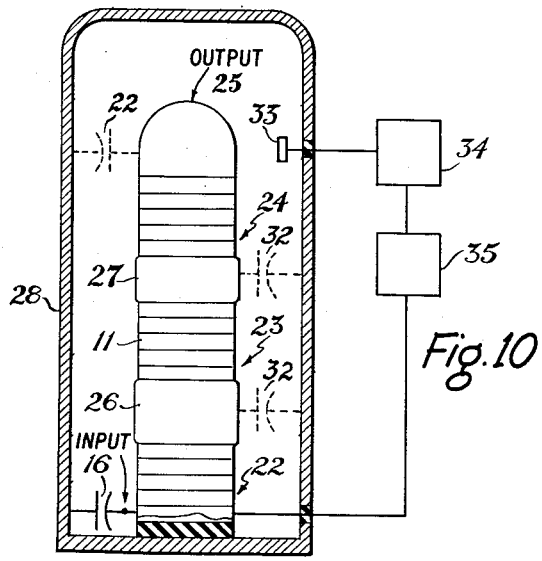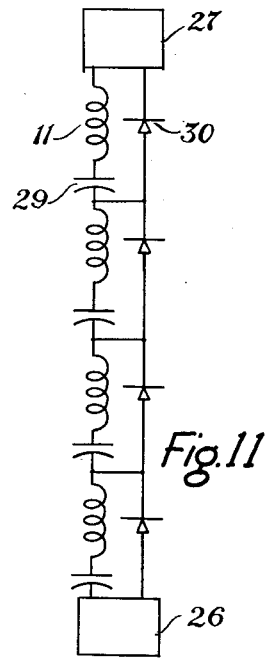

3,014,170
HIGH-VOLTAGE GENERATOR

John C. Nygard, Lexington, Mass., assignor to High Voltage Engineering Corporation, Burlington, Mass., a corporation of Massachusetts.
Filed Nov. 1, 1957, Ser. No. 693,931
6 Claims. (Cl. 321—15)

This invention relates to apparatus for the generation of high voltages and in particular to a novel type of high-voltage generator comprising a transmission line one end of which is raised to high voltage when low-voltage power is fed into the other end thereof. The device operates at resonance and accordingly bears some similarity to resonance transformers. However, the device is not a transformer in the usual sense and has many advantages over conventional resonance transformers.

A variety of resonance transformers are proposed in an article by David H. Sloan entitled, "A Radio Frequency High Voltage Generator," and appearing at vol. 47, page 62, of The Physical Review (1935); cf. U.S. Patents Nos. 2,009,457 and 2,009,458 to Sloan. Other resonance transformers are disclosed by Westendorp in U.S. Patents Nos. 2,144,518 and 2,214,871 and by Charlton and Westendorp at vol. 44, page 654, of the General Electric Review. In the conventional resonance transformer the high voltage circuit comprises an inductance and a capacitance connected in parallel, and power is fed into the high voltage circuit by a primary coil which is inductively coupled to the high voltage coil. The power lost during operation of the device is proportional to the frequency, the capacitance and the square of the maximum voltage, and inversely proportional to the Q of the high voltage circuit where Q is proportional to the quotient of the stored energy divided by the energy lost per cycle. The Q of the high voltage circuit is proportional to the inductance and in the average resonance transformer is about 23.5. The voltage attainable is therefore limited to that value at which the power lost is so great that the heat thus generated cannot be removed from the apparatus. Heat dissipation problems also limit the frequency at which the device can operate. Thus, for example, in the conventional resonance transformer, frequencies as low as 180 cycles per second are employed. The voltage limitation is more severe than the frequency limitation since the power loss is proportional to the square of the voltage. In a one-million-volt resonance transformer the power loss might be 1200 watts, but at two million volts the loss would be quadrupled.

Because of the nature of the coupling between the primary and secondary coils of the conventional resonance transformer, the leakage reactance varies along the secondary coil, so that the volts per turn of the secondary coil is not uniform but varies from maxima at the extremities to a minimum near the middle of the coil.

Resonance transformers are commonly used for the acceleration of charged particles, usually electrons. If the high-voltage output is not rectified, current may be drawn in the acceleration tube for only a part of the cycle. However, the greater the portion of the cycle during which current flows the greater the energy spread in the beam since the voltage wave form is always sinusoidal. The average current is, of course, proportional to the frequency so that higher powers may be achieved by operating at higher frequencies. This can be done without increasing losses and power dissipation requirements if the Q can also be raised by the same proportion. In accordance with the invention, a Q of about 250 to 400 is possible so that the frequency may be raised to 3,000 or 4,000 cycles per second, thus permitting a current increase of about 20 times that available at 180 cycles.

In an air core transformer, as in the conventional resonance transformer, the stray magnetic flux causes losses which limit the Q attainable. In accordance with the invention, large values of Q are made possible by a novel construction of an inductor especially adapted for obtaining large inductance with low loss and the ability to sustain high voltage. Briefly stated, the invention comprehends forming an inductor as one or more toroidal coils each having a core of magnetic material. In a preferred embodiment of the invention, the inductor comprises a series of such toroidal units insulated from one another and connected in series. Preferably the cores are constructed of ferrite or some other material adapted to reduce losses.

When a plurality of little coils are used rather than a single big one, it is no longer possible to feed the power in through a primary coil, and so a capacitive primary is used. Because of the capacitive coupling, the number of volts per turn in the secondary coil is more even, thereby giving a more uniform gradient.

The invention may best be understood from the following detailed description thereof, having reference to the accompanying drawings in which:

FIG. 1 is a vertical transverse section of a single coil constructed in accordance with the invention;

FIG. 2 is a side elevation partly in section of a series of coils of the type shown in FIG. 1;

FIG. 3 is a plan view of a unit comprising a series of coils of the type shown in FIG. 1 insulated from one another;

FIG. 4 is a side elevation of an inductor comprising a multiplicity of units of the type shown in FIG. 3 connected in series and insulated from each other;

FIG. 5 is a plan view of a unit comprising a single toroidal core having a plurality of segments each having its own coil and each being insulated from the others;

FIG. 6 is a side elevation of the unit of FIG. 5;

FIG. 7 is a diagram showing a high-voltage generator embodying the principles of the invention;

FIG. 8 is a circuit diagram showing the equivalent circuit of the high-voltage portion of the generator of FIG. 7;

FIG. 9 is a simplified version of the circuit diagram of FIG. 8;

FIG. 10 is a diagram showing a multiple-unit transmission-line type of high-voltage generator embodying the principles of the invention;

FIG. 11 is a circuit diagram of one of the units of the multiple-unit generator of FIG. 10, showing means for voltage-doubling the high-voltage output through the use of rectifiers; and FIG. 12 is a simplified circuit diagram showing the equivalent circuit of the high-voltage portion of the multiple-unit generator of FIG. 10.

Referring to the drawings and first to FIG. 1 thereof, the basic unit 1 of the invention comprises a toroidal coil 2 having a core 3 of magnetic material, preferably a ferrite or other high-resistance magnetic material. In order to adapt this unit to arrangement in series with other similar units, the unit includes an insulating layer 4. As shown in FIG. 2, a plurality of these units 1 may be stacked so that each is insulated from the others by the insulating layers 4. The coils 2 are connected in series so that an inductor is formed which is capable of sustaining high voltage. Alternatively, a plurality of the inductor units 1 of FIG. 1 may be arranged in one plane upon an insulator 6 as shown in FIG. 3 so as to form an assembly 5; and in still another embodiment of the invention a plurality of the assemblies 5 shown in FIG. 3 may in turn be arranged in a stack insulated from each other by the insulators 6 as shown in FIG. 4.

Inductor coils may be constructed in accordance with the invention so as to have low losses. In the first place, the number of turns necessary to provide a given inductance can be minimized through the use of optimum geometry and through the use of high permeability core materials. In the second place, the inductor coil of the invention is one whose magnetic field can be completely contained to avoid radiation or eddy current losses in the surrounding space.

In the past whenever a coil of appreciable inductance has been required with low losses, the physical size necessary for high-voltage applications has been such that the requirements for low losses were difficult to achieve. In addition to reducing the physical size necessary to achieve large inductances, the inductor coil of the invention solves the appreciable insulating problems which result from the requirement that the coil sustain large voltage between its ends.

One important feature of the invention resides in the fact that it divides the total inductance up into a number of independent inductors each having its own completely closed magnetic circuit. In accordance with the invention, this is accomplished by connecting a number of toroidal cores in series. As a result each of these sub-coils may be sized to optimum dimension for lowest losses.

Another important feature of the invention resides in the fact that the independent cores of these sub-coils can be operated at the potential of the sub-coil and insulated from one another, thereby reducing the problem of insulation between the core and the high-voltage winding.

In a preferred construction, shown in FIGS. 5 and 6, each unit comprises a pair of flat apertured disks 7 of insulating material spaced by radially arranged insulating members 8 which divide the space between the disks 7 into several sectors. A magnetic core 9 having a coil 10 associated therewith is then inserted into each sector so that the cores 9 form a single toroidal core divided electrically but not magnetically into sections by the radial insulating members 8.

One embodiment of the invention is shown in the diagram of FIG. 7. A series of magnetic-core inductor elements 11 are arranged in a column 12 surmounted by a high voltage terminal 13 and the entire structure is enclosed within a tank 14, 15 containing an insulating gas under pressure. The inductor elements 11 are all connected in series, one end of which is connected to the high voltage terminal 13 and the other end of which is connected to the grounded portion 14 of the tank through a condenser 16. The upper portion 15 of the tank is insulated from the lower portion 14 by an insulating joint 17. Power is fed into the device at the junction 36 between the lowermost inductor element 11 and the condenser 16. It will be seen from FIG. 7 that the lead which delivers power to the junction 36 is shown as passing behind the column 12. This power may be fed in by any suitable power source, such as a motor-generator set or an oscillator. In the diagram of FIG. 7 is shown the use of a vacuum-tube oscillator 18 to drive the generator. Such an oscillator always seeks its own frequency. The equivalent circuit is shown in FIG. 8. The input capacitance 19 of FIG. 8 corresponds to the condenser 16 of FIG. 7, and the output capacitances 20, 21 of FIG. 8 in series constitute the total capacitance between the high-voltage terminal 13 and ground. Since a feed back arrangement is required in the device of FIG. 7 to operate the oscillator 18, the tank is divided into two parts 14, 15 in order to provide two capacitances 20, 21 in series, as shown in FIG. 8. The upper capacitance 20 is that between the high voltage terminal 13 and the upper portion of the tank 15 while the lower capacitance 21 is that between the two portions 14, 15 of the tank. The net effect is shown in the simplified circuit diagram of FIG. 9. Very high voltage is produced at the high voltage terminal 13, the step-up ratio being that of the two capacitances 19 and 22, where the capacitance 22, shown in FIG. 9 is the equivalent of the series connection of the capacitances 20 and 21. Referring to FIG. 9, if the total inductance is 50 henries and if the input voltage is 10 kilovolts, one million volts will be obtained at the high-voltage terminal 13 by using a 5000 $\mu\mu f.$ condenser 16 with a terminal-to-ground capacitance of 50 $\mu\mu f.$ The transient problem is very simple as compared with an ordinary solenoid which has mutual inductance. If one of the coils is shorted, this merely raises the frequency, which is inversely proportional to the square root of the inductance, so that a 5% inductance change produces a 2% frequency change. If there should be an open circuit this would be cut through across one of the protective spark gaps (not shown).

A representative column might have 20 or so toroids, each toroid containing about 8 coils producing 5 or 6 kilovolts each. Assuming a loss of 1200 watts, which would be easy to dissipate, several milliamperes would be available for use in an acceleration tube (not shown). One problem resulting from A.C. operation is that the acceleration tube must hold the inverse voltage. This problem can be avoided by rectifying the A.C. Such rectification is also necessary for a multiple-unit transmission-line type generator as shown in FIG. 10.

Under A.C. operation, as in the generator shown in FIG. 7, the high-voltage terminal 13 fluctuates between 1 million volts positive and 1 million volts negative. If the output were rectified in accordance with the circuit of FIG. 11, the terminal 13 would vary between zero and 2 million volts.

Referring to the diagram of FIG. 10, a series of magnetic-core elements 11 are arranged in a column 22, 23, 24 surmounted by a high-voltage terminal 25 and subdivided into three sections 22, 23, 24 by two intermediate terminals 26, 27. The entire structure is enclosed within a tank 28 containing an insulating gas under pressure.

The circuitry of the individual sections 22, 23, 24 of FIG. 10 is shown in FIG. 11. The individual magnetic-core elements 11 are separated by condensers 29 (not shown in FIGS. 10 and 12) of about .1 $\mu f.$ which constitute an A.C. short but a D.C. block. Across each series combination of condenser 29 and inductor 11 is connected a rectifier 30 (not shown in FIGS. 10 and 12). The complete circuit of the apparatus of FIG. 10 is shown in FIG. 12, in which each inductor 31 represents an entire section 22, 23 or 24 as shown in FIG. 10. The intermediate capacitances 32 are those between the intermediate terminals 26, 27 and the tank 28. In the apparatus of FIG. 10 feedback is accomplished by a small pickup electrode 33 whose output is amplified by an amplifier 34 and the amplified signal is fed into an oscillator 35. The output of the oscillator 35 drives the generator of FIG. 10 in the same manner as the generator of FIG. 7 is driven.

As is apparent from an inspection of the circuit shown in FIG. 12, the device of FIG. 10 operates as a lumped-element open-ended transmission line in which the production of standing waves as a result of feeding in power at the resonant frequency generates high voltage at the end of the line. It is essential that each inductance element 31 shown in FIG. 12 include rectification means, such as that shown at 30 in FIG. 11. The voltage-doubling circuit shown in FIG. 11 will be recognized by those skilled in the art as one which utilizes the principle of the Villard circuit, wherein the potential of the one terminal is caused to vary between 0 and 2 v. rather than between +v. and −v. with respect to the other terminal.

Throughout the specification and claims the term "ground" is used to mean not only the actual ground potential, but the term includes any fixed reference potential.

Having thus described the principles of the invention together with several embodiments thereof, it is to be understood that although specific terms are employed, they are used in a generic and descriptive sense, and not for purposes of limitation, the scope of the invention being set forth in the following claims.

I claim:

1. A high-voltage generator comprising in combination: a large inductance having at least one high-permeability closed magnetic circuit and capable of insulating high voltage across its extremities, one of said extremities being electrically connected to ground through a larger capacitance and the other of said extremities being electrically connected to ground through a smaller capacitance, and means for feeding low-voltage A.C. power across the larger capacitance at the resonant frequency of the combination of said inductance and the smaller capacitance, whereby high voltage is generated across the smaller capacitance.

2. A high-voltage generator in accordance with claim 1; wherein said closed magnetic circuit includes a high-resistance magnetic material such as a ferrite.

3. A high-voltage generator in accordance with claim 1, wherein said large inductance comprises a plurality of coils each having its own high-permeability closed magnetic circuit, said coils being connected in series and said closed magnetic circuits being electrically insulated from one another.

4. A high-voltage generator in accordance with claim 1, wherein said closed magnetic circuit comprises a plurality of sections electrically insulated from each other.

5. A high-voltage generator comprising in combination: a large inductance having at least one high-permeability closed magnetic circuit and capable of insulating high voltage across its extremities, a high-voltage terminal electrically connected to one end of said inductance, a condenser electrically connected between the other end of said inductance and ground, and means for applying A.C. power across said condenser at the resonant frequency of the combination of said inductance and the capacitance between said high-voltage terminal and ground.

6. A high voltage generator comprising in combination: a lumped-element open-ended transmission line comprising a series of inductance sections, a high voltage terminal electrically connected to one end of said series, a condenser electrically connected between the other end of said series and ground, each of said inductance sections comprising at least one capacitance and at least one large inductance having at least one high-permeability closed magnetic circuit and capable of insulating high voltage across its extremities, said capacitance and inductance being connected in series with each other and in parallel with rectifying means, said high-voltage terminal being electrically connected to ground through a high-voltage capacitance and each junction between adjacent inductance sections being connected to ground through an intermediate capacitance, said high-voltage capacitance and said intermediate capacitances forming with said inductance sections a lumped-element open-ended transmission line, and means for applying A.C. power across said condenser at the resonant frequency of said transmission line.

References Cited in the file of this patent

UNITED STATES PATENTS

| | | |
|---|---|---|
| 2,477,693 | Guanella | Aug. 2, 1949 |
| 2,730,667 | Uhlmann | Jan. 10, 1956 |
| 2,759,155 | Hackenberg | Aug. 14, 1956 |
| 2,835,874 | First et al. | May 20, 1958 |